(12) United States Patent
Stenström et al.

(10) Patent No.: US 6,888,903 B1
(45) Date of Patent: May 3, 2005

(54) DIGITAL COMMUNICATION RECEIVER AND A METHOD FOR THE OPERATION THEREOF

(75) Inventors: Niklas Stenström, Helsingborg (SE); Anders Khullar, Bjärred (SE); Bengt Lindoff, Lund (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 647 days.

(21) Appl. No.: 09/718,667

(22) Filed: Nov. 22, 2000

(30) Foreign Application Priority Data

Nov. 25, 1999 (SE) .............................................. 9904281

(51) Int. Cl.⁷ ................................................ H04B 1/10
(52) U.S. Cl. ..................................... 375/350; 375/348
(58) Field of Search ......................... 375/316, 340–342, 375/343, 229, 230, 231, 232, 346, 348–350, 365, 366; 455/296, 63.1; 708/322, 323; 714/792, 774, 775, 795, 796, 797; 370/337, 347

(56) References Cited

U.S. PATENT DOCUMENTS

| | | | | |
|---|---|---|---|---|
| 5,185,764 A | * | 2/1993 | Baier .......................... | 375/231 |
| 5,268,930 A | * | 12/1993 | Sendyk et al. ............... | 375/231 |
| 5,363,411 A | * | 11/1994 | Furuya et al. ............... | 375/316 |
| 5,471,501 A | * | 11/1995 | Parr et al. .................... | 375/354 |
| 5,499,272 A | * | 3/1996 | Bottomley .................... | 375/347 |
| 5,537,438 A | * | 7/1996 | Mourot et al. ............... | 375/231 |
| 5,577,068 A | * | 11/1996 | Bottomley et al. .......... | 375/232 |
| 5,862,156 A | * | 1/1999 | Huszar et al. ............... | 714/795 |
| 6,151,484 A | * | 11/2000 | Ramesh ........................ | 455/68 |
| 6,263,030 B1 | * | 7/2001 | Khayrallah .................. | 375/341 |
| 6,275,525 B1 | * | 8/2001 | Bahai et al. ................. | 375/232 |
| 6,320,919 B1 | * | 11/2001 | Khayrallah et al. ......... | 375/347 |
| 6,370,189 B1 | * | 4/2002 | Morrison et al. ............ | 375/224 |
| 6,411,649 B1 | * | 6/2002 | Arslan et al. ................ | 375/232 |
| 6,459,728 B1 | * | 10/2002 | Bar-David et al. .......... | 375/231 |
| 6,466,616 B1 | * | 10/2002 | Stenstrom et al. .......... | 375/233 |

FOREIGN PATENT DOCUMENTS

| | | |
|---|---|---|
| EP | 0 419 205 A2 | 3/1991 |
| EP | 0 714 217 A2 | 5/1996 |
| EP | 0 833 538 A2 | 4/1998 |
| GB | 2 305 825 A | 4/1997 |

OTHER PUBLICATIONS

International–Type Search Report prepared by ISA/SE in connection with priority application 9904281–4 with a mailing date of Sep. 20, 2000.

* cited by examiner

*Primary Examiner*—Bocure Testaldet
*Assistant Examiner*—Khanh Cong Tran
(74) *Attorney, Agent, or Firm*—Jenkens & Gilchrist, P.C.

(57) ABSTRACT

A digital communication receiver communicates with a digital communication transmitter across a communication channel and has: a channel estimator, which provide a channel estimate of the communication channel based on a received signal; an equalizer, which estimates a sequence of transmitted symbols and provides a sequence of decided symbols based on the received signal and the channel estimate; and a channel tracker, which produces an updated channel estimate based on the received signal and the decided symbols, and which supplies the updated channel estimate to the equalizer. The digital communication receiver has a controller, which receives channel quality indicative data associated with an output from the equalizer, determines whether these data fail to meet a predetermined criterion, and, if so, supplies an enabling control signal to the channel tracker.

14 Claims, 5 Drawing Sheets

DIGITAL COMMUNICATION RECEIVER AND A METHOD FOR THE OPERATION THEREOF

TECHNICAL FIELD

The present invention relates to digital communication receivers of the type, which is adapted to communicate with a digital communication transmitter across a communication channel and which comprises a channel estimator for providing a channel estimate of the communication channel based on a received signal, an equalizer for estimating a sequence of transmitted symbols and providing a sequence of decided symbols based on the received signal and the channel estimate, and a channel tracker for producing an updated channel estimate based on the received signal and the decided symbols and for supplying the updated channel estimate to the equalizer. The invention is also directed at a wireless communication device, for instance a radio telephone, incorporating such a digital communication receiver, for instance a TDMA receiver.

Moreover, the present invention relates to a method of operating a digital communication receiver, where a channel estimate of a communication channel between the receiver and a corresponding communication transmitter is produced from a received signal, and where a sequence of decided symbols in produced from the received signal and the channel estimate.

DESCRIPTION OF RELATED ART

Digital communication receivers as set out above are widely used in modern communication systems. For instance, most modem systems for mobile or cellular telecommunication are based on digital communication, GSM and EDGE being two well-known examples. In a digital communication system, the digital communication receiver necessarily requires a considerable level of complexity in order to be able to handle signal distortion, such as multipath propagation, and still be able to decode data transmitted from a digital communication transmitter. One pronounced problem is that the radio channel between the transmitter and the receiver is time-varying, the reason for this being either that the host communication device itself (the device in which the receiver is incorporated, such as a mobile telephone) is moving, or that external objects are moving (for instance cars or trains) and generate spurious reflections of the transmitted radio wave, which may reach the receiver. There is consequently a need for a receiver technology, which is able to adapt to the time-varying real-life environment.

In Time Division Multiple Access (TDMA), used for instance in GSM, the information is transmitted in bursts from the transmitter across the radio channel to the receiver. Each burst contains information-carrying data, the contents of which are unknown a priori to the receiver, as well as a known training sequence. The training sequence is used for the purpose of synchronization and channel estimation in order to perform coherent detection of the received signal.

FIG. 1 illustrates a TDMA receiver architecture of the prior art. The burst is received at an antenna 1 as a radio or microwave signal having a carrier frequency of e.g. 900 MHz or 1800 MHz. A front-end receiver 110 receives the signal from the antenna 1, processes it and converts it down to a baseband signal $y_t$. The front-end receiver 110 comprises various well-known components, such as filters, amplifiers, mixers and local oscillators.

The received baseband signal $y_t$ is fed to a synchronizer 120, which is arranged to correlate the known training sequence with the received signal $y_t$, which contains the same training sequence, wherein the synchronizer 120 is able to locate a synchronization position. The received signal $y_t$ is then fed together wish the located synchronization position to a channel estimator 130. The channel estimator is arranged to determine an estimate, H, of the radio channel.

As a next step, the received baseband signal $y_t$, the channel estimate H and the synchronization position are all supplied to an equalizer 140, which—based on a predetermined channel model—demodulates the received signal $y_t$ in order to estimate the transmitted data. The channel model may for instance be expressed as:

$$Y_t = H^T U_t + e_t,$$

where $H=[h_0, \ldots, h_L]^T$ are complex-valued channel filter taps, $U_t[u_t, \ldots, u_{t-L}]^T$ are a vector with the transmitted symbols, and $e_t$ represents noise. This channel model is further described in *Digital Communications*, by J. Proakis, Mc McGraw-Mill, New York, 1995, which is fully incorporated herein by reference.

In other words, the equalizer 140 is arranged to estimate the transmitted symbols, $u_t$. The equalizer 140 provided as a first output a sequence of decided symbols $\hat{u}_t$ and as a second output a qualitative information $M_t$ (labeled Metric in FIG. 1), which is a measure of how close to the transmitted symbols the estimated symbols are. This qualitative information will be used when the received signal is processed further. Commonly, the qualitative information, is based on a squared distance between the received sequence and the predicted received sequence given the decided symbols, i.e.:

$$M_t = |y_t - y^-_t|^3 = |y_t - H^T U_t|^3,$$

where $U_t = [\hat{u}_t, \ldots, \hat{u}_{t-L}]^T$ is a vector with the decided symbols. It is observed that if $M_t$ has a small value, then the estimated channel H≈the real channel $H_{roal}$, i.e. the estimated channel filter taps are essentially correctly estimated, and furthermore $U = U_{transmitted}$, i.e. the estimated symbols are correct.

The procedure above exhibits good performance, if the host communication device is not moving too rapidly. Under such conditions, a reasonably valid assumption is that the channel filter tape H are constant during one burst of transmitted information. However. when the velocity of the host communication device increases, the radio channel starts changing over the burst, which means that the channel estimate obtained by way of the training sequence will not be valid for the entire data sequence within the burst. For instance, for a TDMA receiver used in GSM, where GMSK as modulation is utilized on the 1800 MHz band, performance starts to degrade, when the velocity of the host communication device increases above 100–200 km/h. In an EDGE system, where 8-PSK modulation is utilized, which is more sensitive to distortions than GMSX modulation, at the same frequency, performance starts to degrade already at velocities around 50 km/h. Thus, in order to handle this problem, a channel tracker is required.

A previously known TDMA receiver architecture with a channel tracker is shown in FIG 2. As in FIG. 1, the burst received by the antenna 1 is converted to a received baseband signal $y_t$ by a front-end receiver 210. The received signal is correlated with the known training sequence by a synchronizer 220 in order to find the synchronization position, and then the channel is estimated by a channel estimator 230 in correspondence with what has been described above for channel estimator 130 of FIG. 1.

The channel estimate $H_o$ is an initial estimate, which is used to start up an equalizing process performed by an equalizer 240. As has already been described above with reference to FIG. 1, the equalizer 240 estimates a sequence of decided symbols $\hat{u}_t$ as well as qualitative information (Metric). The decided symbols $\hat{u}_t$ are supplied together with the received signal $y_t$ to a channel tracker 250, which updates the channel estimate $H_t$ for each time instant $t=1,\ldots,N$, where N is the duration of the burst. The channel estimate $H_t$ is subsequently fed back to the equalizer 240, which will use the updated channel estimate in order to demodulate $\hat{u}_{t-1}$ and so on.

By using a channel tracker 250, problems can be managed, that are otherwise associated with host communication devices travelling at high-velocities. However, the channel tracker 250 of the prior art receiver shown in FIG. 2 is used constantly during all operational times, which means that a lot of unnecessary data processing is performed by the receiver, even when the velocity of the host communication device is low and good performance may be obtained without using a channel tracker. Moreover, since the channel tracker 250 is used all the time, the current consumption is undesiredly high for a previously known receiver, like the one illustrated in FIG. 2.

SUMMARY OF THE INVENTION

It is an object of the present to provide an improvement to digital communication receivers as described above in terms of current efficiency, i.a.

The above object has been achieved by the provision of a controller, which determines and evaluates the momentary quality of the communication channel and in response generates a control signal, which is used for enabling or disabling the channel cracker in a way, so that the channel tracker is only active in circumstances, where so is needed (when the quality of the communication channel is degraded due to e.g. high-velocity movement of the digital communication receiver).

Thus, according to the invention the channel tracker is turned on or off based on the current radio channel conditions. The decision whether to turn the channel tracker on or off may be based on the qualitative information output from the equalizer. The decision may alternatively be based on a comparison between new channel estimates at the end and/or at the beginning of a burst and an initial channel estimate. By using the channel tracker only when necessary, processing power consumed by the receiver can be reduced, thereby allowing longer operational times between battery chargings in a portable host processing device, such as a mobile or cellular radio telephone.

Other objects, advantages and features of the present invention will appear from the following detailed disclosure of preferred and alternate embodiments, from the appended claims as well as from the drawings.

BRIEF DESCRIPTION OF THE DRAWINGS

The present invention will now be described in more detail with reference to a preferred and an alternate embodiment in conjunction with the attached drawings, in which.

DETAILED DISCLOSURE OF EMBODIMENTS

Figure 5:
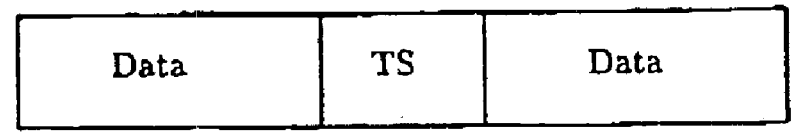
FIG. 5 is a triple-graph diagram illustrating the typical appearance of the qualitative information output from the equalizer of the receiver in three different situations.
Figure 5:
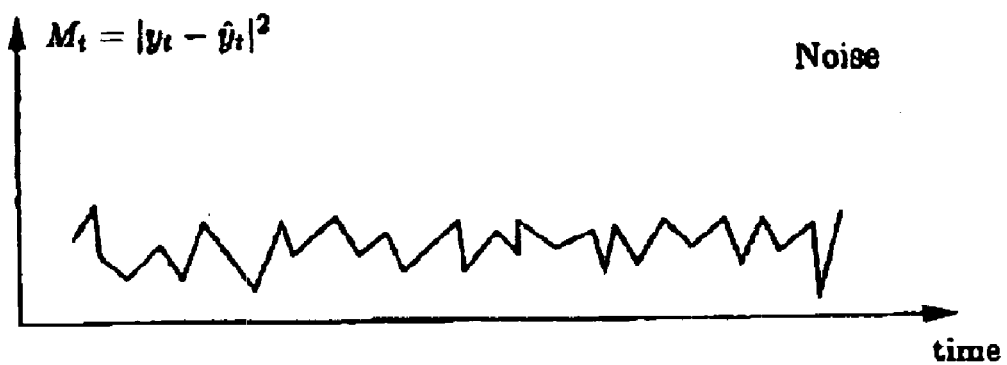
Figure 5:
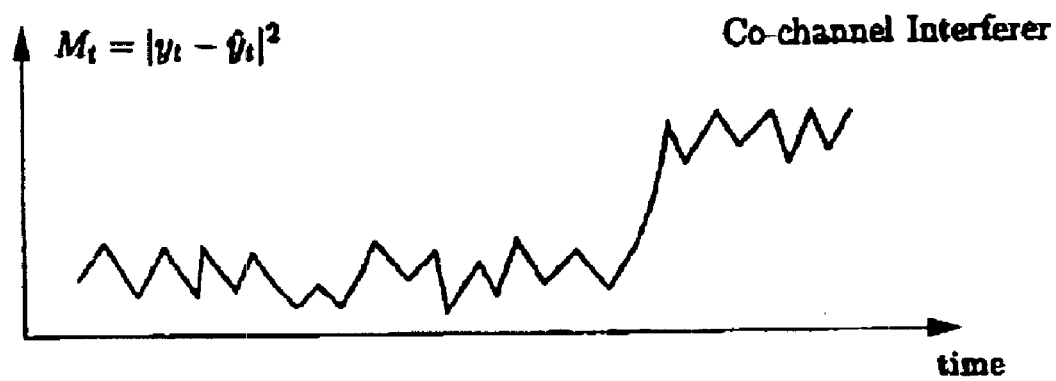
Figure 5:
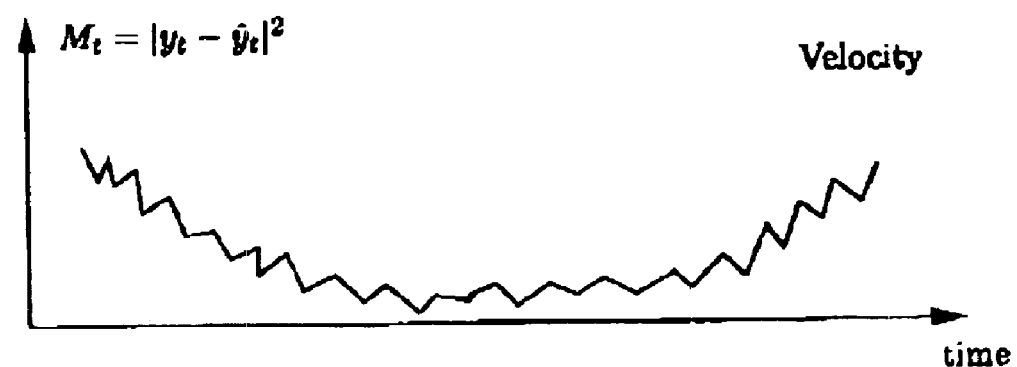

Referring first to FIG. 5, it is observed that the behavior of the qualitative information output ($M_t$, Metric) of the equalizer depends on which kind of distortion, that is affecting the received signal $y_t$. Three different typical behaviors of the qualitative information are shown for a receiver without any channel tracker (i.e. like the one illustrated in FIG. 1) for three different scenarios. The fact that the receiver has no channel tracker means that the channel estimate obtained during the training sequence will be used for the entire burst.

The uppermost graph of FIG. 5 illustrates a scenario, where white noise represents the dominating distortion. It appears that the qualitative information is quite constant during both the training sequence (TS) and the information sequence (Data).

In the second graph, the dominating distortion originates from a co-channel interferer, i.e. a remote transmitter, which is transmitting on the same carrier frequency. Since the co-channel interferer might not be synchronized with the desired signal, only some part of the burst may be distorted (in FIG. 5, the rightmost portion of the second graph).

In the lowermost graph of FIG. 5, the distortion is due to high velocity of the hoot communication device, implying that the communication channel is time-varying and changing over the burst. Since the channel taps, H, used in the equalizer are estimated during the training sequence and are therefore optimized for the center of the burst (in the example shown in FIG. 5), the qualitative information increases at the end of the burst. This behavior of the qualitative information can be used according to the invention for determining whether the channel tracker needs to be enabled or not.

Figure 3:
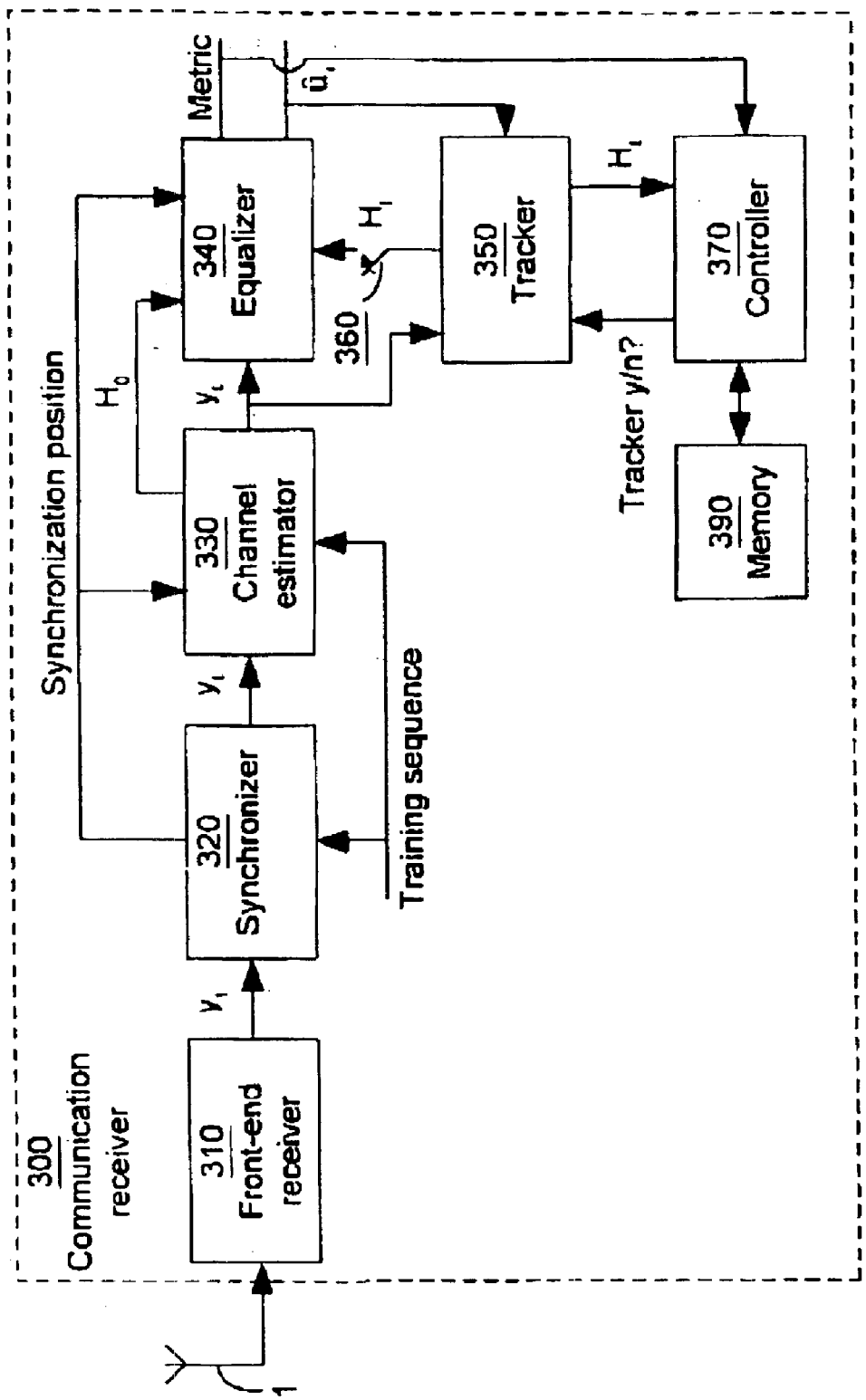
FIG. 3 is a schematic block diagram illustrating a digital communication receiver according to a preferred embodiment, FIG. 4 in a schematic block diagram illustrating a digital communication receiver according to an alternate embodiment.

FIG. 3 illustrates a digital communication receiver 300 according to a preferred embodiment of the invention.

Figure 1:
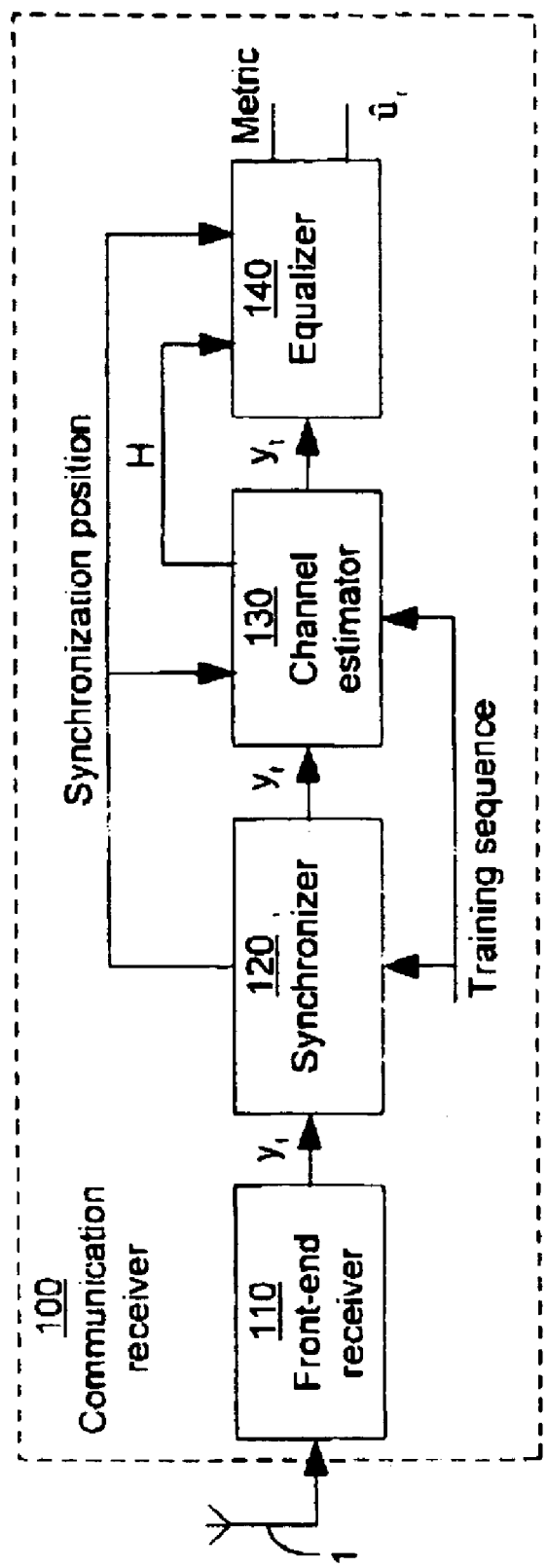
FIGS. 1 and 2 are illustrations of two communication receivers of the prior art.
Figure 2:
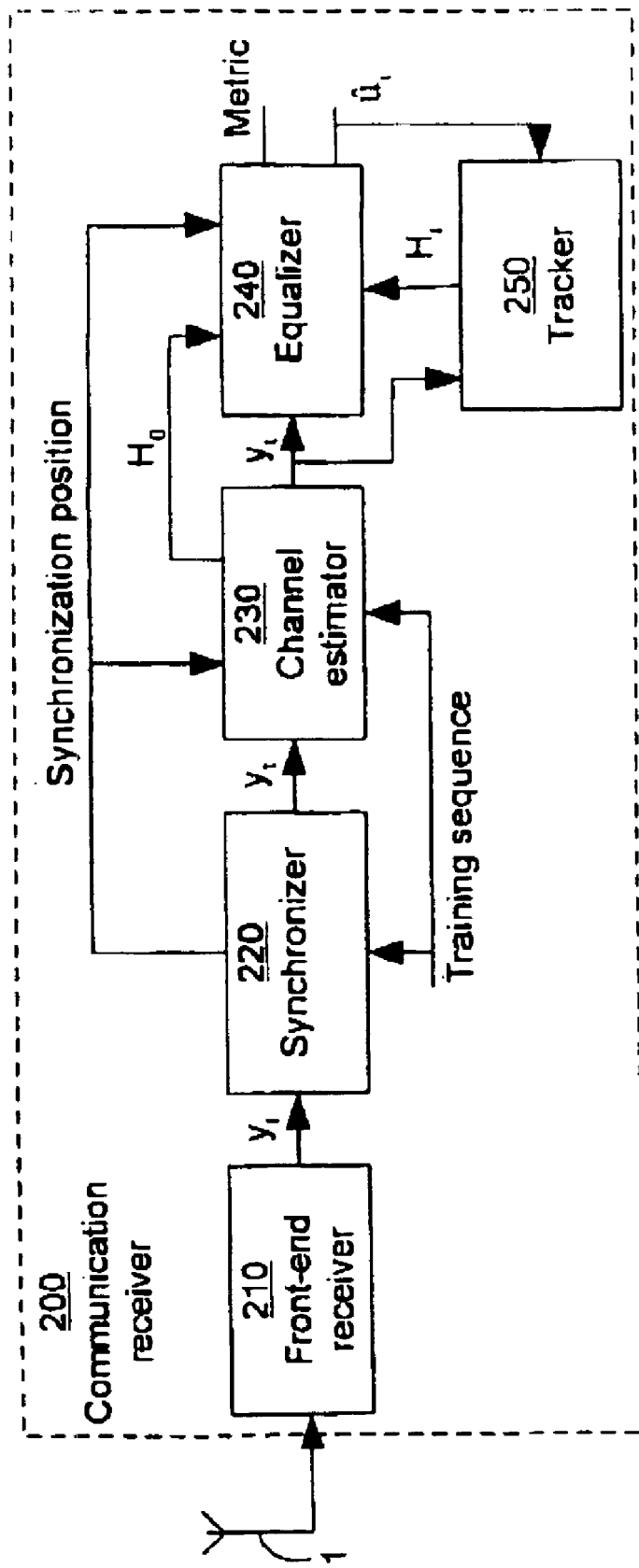

In similarity with the prior art receivers shown in FIGS. 1 and 2, the digital communication receiver 300 is connected to an antenna 1 for receiving a radio or microwave signal transmitted by a digital communication transmitter. The radio or microwave signal is supplied to a front-end receiver 310, which converts the signal down to a received baseband signal $y_t$, in similarity with what has been described above with reference to FIGS. 1 and 2. The front-end receiver 310 comprises various components known per se, such as filters, amplifiers, local oscillators and mixers, all of which are well-known to a man skilled in the art. Consequently, the internal structure of the front-and receiver 310 is not dealt with further herein.

The received signal $y_t$ is supplied to a synchronizer 320, which correlates a known training sequence with the received signal $y_t$ containing the same training sequence, wherein the synchronizer 320 is able to locate the synchronization position. The received signal $y_t$ in supplied together with the synchronization position to a channel estimator 330, which estimates the channel, $H_o$ in a way essentially similar to what has been described with reference to FIGS. 1 and 2.

The received signal $y_t$, the channel estimate H, and the synchronization position are then supplied to an equalizer 340, which modulates the received signal in order to obtain the transmitted data. As was described already with reference to FIGS. 1 and 2, the equalizer 340 provides a first output in the form of a sequence of decided symbols $\hat{u}_t$ and a second output in the form of a qualitative information (Metric).

The decided symbols $\hat{u}_t$ are supplied together with the received signal $y_t$ to a channel tracker 350, which will update the channel estimate $H_t$ for each time instant t=1, ..., N, where N is the duration of the burst. The updated channel estimate $H_t$ is then fed back to the equalizer 340 through a switch 360, on condition that the switch 360 assumes a closed position. As will be described below, the switch 360 is controllable through a controller 370. If an updated channel estimate $H_t$ is in fact fed back through the closed switch 360 to the equalizer 340, the equalizer 340 will use the updated-channel estimate $H_t$ when demodulating $\hat{u}_{t-1}$, and so on.

As mentioned above, a controller 370 is provided in the communication receiver 300 shown in FIG. 3. The controller 370 has a first input for receiving an updated channel estimate $H_t$ from the channel tracker 350. The controller 370 also has a second input for reading the qualitative information Metric provided by the equalizer 340. Based on the qualitative information, the controller 370 determines and evaluates the quality of the communication channel in order to decide whether the channel tracker 350 needs to be used or not. To this end, the channel tracker 350 is enabled and disabled, respectively, via a control signal from the controller 370 (labeled "Tracker y/n?" in FIG. 3). In the preferred embodiment of FIG. 3, this control signal is given a first value when the channel tracker 350 is to be enabled, and a second value when the channel tracker 350 is to be disabled.

The controller 370 is coupled to an electronic memory 390 (preferably a non-volatile memory such as a flash memory, an (EE)PROM memory or an SRAM memory) for storing a predetermined threshold value, i.e. an upper limit, for the qualitative information (Metric) from the equalizer 350. This upper limit defines an acceptable limit for a difference, preferably a squared distance as-described above, between symbols in the received signal ($y_t$) and symbols in a predicted received signal given the decided symbols ($\hat{u}_t$). In other words, the qualitative information is representative of a degree of correspondence between the received signal and the decided symbols, and the controller 370 uses the predetermined upper limit as a criterion for determining whether the qualitative information does not meet this criterion, and consequently, whether the control signal "Tracker y/n?" will have to be given its first value, indicating that the channel tracker 350 needs to be enabled.

The controller 370 may be realized as a programmable microprocessor, a programmable logic array, other logic circuitry, discrete logic gates and components, etc.

In the communication receiver 300 shown in FIG. 3, assuming that the channel tracker 350 has been enabled at some previous moment of time by the controller 370, the controller 370 is also adapted to determine whether the channel tracker 350 may be disabled (turned off). In this case, it is lees suitable to use the above qualitative information produced by the equalizer 340, since the channel tracker 350 will try to follow the variations in the communication radio channel, implying that the qualitative information produced by the equalizer 340 will be approximately constant during the entire burst. Instead, the channel estimates $H_t$ are supplied to the control unit 370, which will use these for determining whether the channel tracker 350 may be turned off or not. For instance, if $H_o \approx H_{start} \approx H_{end}$, where $H_t$ is the initial channel estimate and $H_{start}$, $H_{end}$ are the channel estimates at the beginning and the end of the burst, respectively, then the quality of the radio channel is acceptable, and the controller 370 determines that the channel tracker 350 may be turned off or disabled by giving the control signal "Tracker y/n?" a second value, as previously described.

On the other hand, if $\|H_o-H_{start}\|>>0$ and $\|H_o-H_{end}\|>>0$, the controller 340 decides to continue using the channel tracker 350 and, consequently, gives the control signal "Tracker y/n?" its first value, as previously described. The control signal "Tracker y/n?" is also supplied to the switch 360 for setting it to an open and closed position, respectively.

Figure 4:
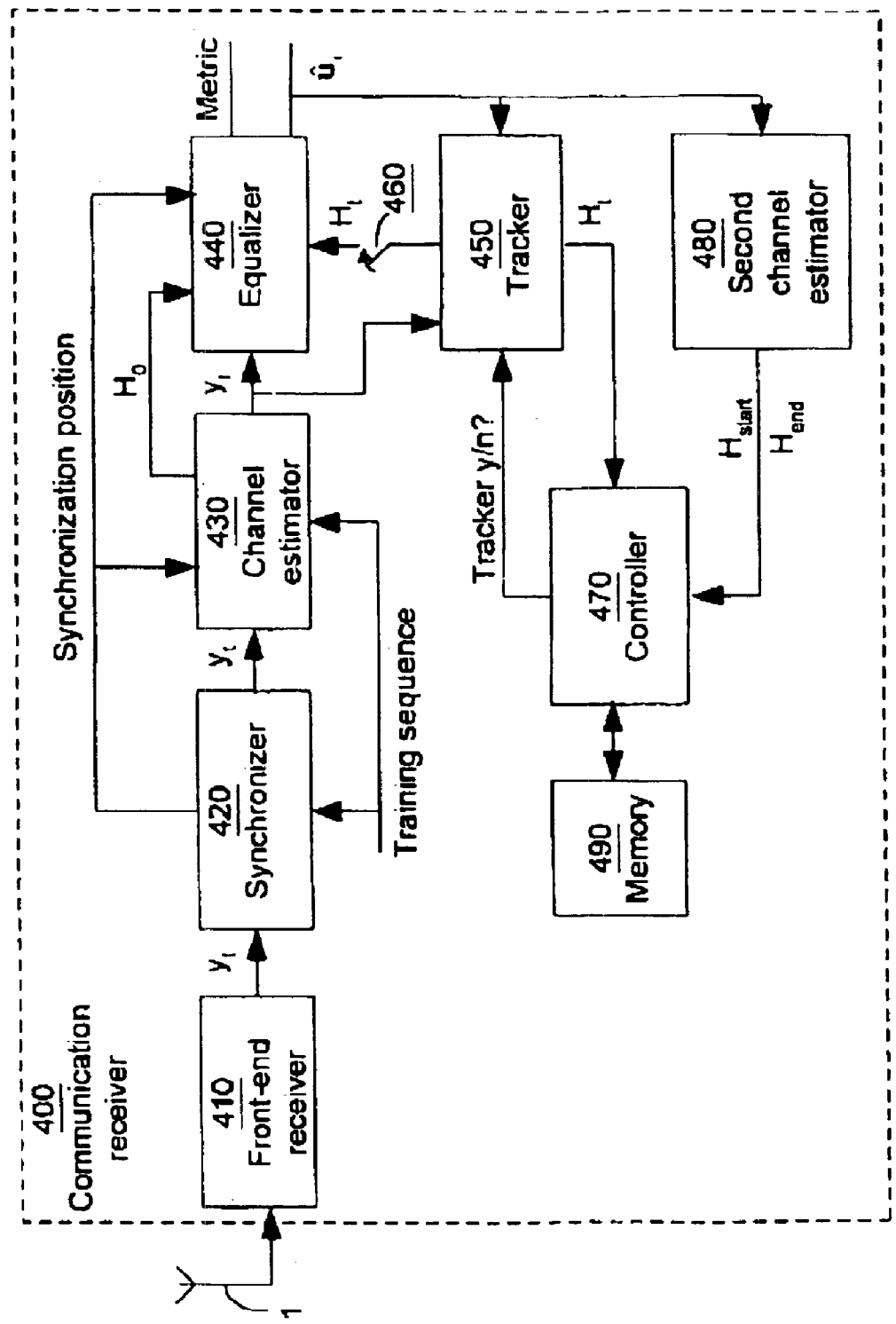

Referring now to FIG. 4, an alternate embodiment of the communication receiver 400 is shown. The antenna 1, front-end receiver 410, synchronizer 420, channel estimator 430, equalizer 440, channel tracker 450 and memory 490 are all essentially identical to the antenna 1, front-end receiver 310, synchronizer 320, channel estimator 330, equalizer 340, channel tracker 350 and memory 390 of FIG. 3, and the description thereof is not repeated now.

In contrast to FIG. 3, on the other hand, the communication receiver 400 of FIG. 4 does not use the qualitative information, Metric, when determining whether the channel tracker 350 is to be enabled or disabled. Instead, the decided symbols, $\hat{u}_t$, are supplied to a second channel estimator 460. Based on the decided symbols at the beginning and the end of the burst, new channel estimates, $H_{start}$ and $H_{end}$, are obtained by the second channel estimator 480 and submitted to the controller 470. If $\|H_o-H_{start}\|>>0$ and $\|H_o-H_{end}\|>>0$, the controller 470 decides to enable the channel tracker 450 by providing its control signal "Tracker y/n?" with a first value, wherein the channel tracker 450 will be ready to be used when the next burst is received. The decision whether to turn the channel tracker 450 off is made in essentially the same way, as has been described above with reference to FIG. 3.

The digital communication receivers 300 and 400 shown in FIGS. 3 and 4 are particularly well adapted to be incorporated in a portable radio telephone, such as a GSM mobile telephone. Alternatively, a digital communication receiver according to the invention may very well be incorporated in a base station in a mobile telecommunication system, such an a GSM base station. However, the present invention is nor limited to these examples, and the digital communication receiver according to the invention may be incorporated in virtually-any host communication device. Other embodiments than the ones described above are equally applicable within the scope of the invention, as defined by the appended independent claims.

What is claimed is:

1. A digital communication receiver adapted to communicate with a digital communication transmitter across a communication channel, the digital communication receiver comprising:

a first channel estimator adapted to provide a channel estimate of the communication channel based on a received signal;

an equalizer adapted to estimate a sequence of transmitted symbols and provide a sequence of decided symbols based on the received signal and the channel estimate;

a channel tracker adapted to produce an updated channel estimate based on the received signal and the decided symbols and to supply the updated channel estimate to the equalizer;

a controller operatively coupled to the equalizer and the channel tracker;

wherein the controller is adapted to receive channel quality indicative data associated with an output from the equalizer, to determine whether the channel quality indicative data fail to meet a predetermined criterion, and, if so, to supply an enabling control signal to the channel tracker; and wherein the enabling control signal is adapted to switch the channel tracker from a disabled state, in which disabled state no channel tracker within the digital communication receiver is enabled, to an enabled state, in which enabled state the updated channel estimate is produced.

2. The digital communication receiver as in claim 1, wherein the channel quality indicative data are produced by the equalizer and represent a degree of correspondence between the received signal and the decided symbols.

3. The digital communication receiver as in claim 2, wherein the channel quality indicative data are computed by the equalizer as a squared distance between symbols in the received signal and symbols in a predicted received signal given the decided symbols.

4. The digital communication receiver as in claim 1, wherein the predetermined criterion is stored as a threshold value in an electronic memory operatively coupled to the controller.

5. The digital communication receiver as in claim 1, further comprising:

a second channel estimator, which is operatively coupled to the equalizer and the controller;

wherein the channel quality indicative data are produced by the second channel estimator in the form of additional channel estimates based on the decided symbols from the equalizer; and wherein the controller is adapted to compare the additional channel estimates with an initial channel estimate and to produce the enabling control signal if the comparison indicates a difference bigger than the predetermined criterion.

6. The digital communication receiver as in claim 1, wherein the receiver is capable of Time Division Multiple Access communication.

7. A digital communication receiver adapted to communicate with a digital communication transmitter across a communication channel, the digital communication receiver comprising:

a channel estimator adapted to provide a channel estimate of the communication channel based on a received signal;

an equalizer adapted to estimate a sequence of transmitted symbols and provide a sequence of decided symbols based on the received signal and the channel estimate;

a channel tracker adapted to produce an updated channel estimate based on the received signal and the decided symbols, and adapted to supply the updated channel estimate to the equalizer;

a controller operatively coupled to the channel tracker;

wherein the controller is adapted to compare the updated channel estimate with an initial channel estimate and to supply a disabling control signal to the channel tracker, if the comparison indicates a difference smaller than a predetermined criterion; and wherein the disabling control signal is adapted to switch the channel tracker from an enabled state, in which enabled state the updated channel estimate is produced, to a disabled state, in which disabled state no updated channel estimate is produced.

8. The digital communication receiver as in claim 7, the receiver being capable of Time Division Multiple Access (TDMA) communication, wherein the updated channel estimate relates to the beginning and/or the end of a TDMA burst.

9. The digital communication receiver of claim 7, wherein the digital communication receiver comprises a wireless communication device.

10. The digital communication receiver of claim 7, wherein the digital communication receiver comprises a radio telephone.

11. The digital communication receiver of claim 7, wherein the digital communication receiver comprises a base station in a cellular communication system.

12. A method of operating a digital communication receiver, wherein a channel estimate of a communication channel between the receiver and a digital communication transmitter is produced from a received signal and a sequence of decided symbols is produced from the received signal and the channel estimate, the method comprising:

producing channel quality indicative data as additional channel estimates based on the decided symbols;

receiving the channel quality indicative data, the channel quality indicative data being directly or indirectly associated with the sequence of decided symbols;

determining whether the channel quality indicative data fail to meet a predetermined criterion, wherein the predetermined criterion is a degree of correspondence between the additional channel estimates and an initial channel estimate; and conditionally, if the predetermined criterion is not met, switching a channel tracker from a disabled state, in which disabled state no channel tracker within the digital communication receiver is enabled, to an enabled state, in which enabled state an updated channel estimate is produced from the received signal and the sequence of decided symbols.

13. A method of operating a digital communication receiver, wherein a channel estimate of a communication channel between the receiver and a digital communication transmitter is produced from a received signal and a sequence of decided symbols is produced from the received signal and the channel estimate, the method comprising:

a) receiving an updated channel estimate based on the decided symbols;

b) comparing the updated channel estimate with an initial channel estimate; and c) conditionally, if the comparison indicates a difference smaller than a predetermined criterion, switching a channel tracker from an enabled state, in which enabled state an updated channel estimate is produced from the received signal and the sequence of decided symbols, to a disabled state, in which disabled state no channel tracker within the digital communication receiver is enabled.

14. The method as in claim 13, wherein:

the receiver is capable of Time Division Multiple Access (TDMA) communication; and the updated channel estimate relates to the beginning and/or the end of a TDMA burst.

* * * * *

UNITED STATES PATENT AND TRADEMARK OFFICE
CERTIFICATE OF CORRECTION

| | |
|---|---|
| PATENT NO. | : 6,888,903 B1 |
| APPLICATION NO. | : 09/718667 |
| DATED | : May 3, 2005 |
| INVENTOR(S) | : Niklas Stenstrom et al. |

It is certified that error appears in the above-identified patent and that said Letters Patent is hereby corrected as shown below:

On the Title Page, Field (57), under "ABSTRACT", in column 2, Line 12, after "receiver" insert -- also --.

In Column 2, Line 6, delete "wish" and insert -- with --, therefor.

In Column 2, Line 22, delete "Mill" and insert -- Hill --, therefor.

In Column 2, Line 25, delete "provided" and insert -- provides --, therefor.

In Column 2, Line 40, delete "$H_{roal}$" and insert -- $H_{real}$ --, therefor.

In Column 2, Line 47, delete "tape" and insert -- taps --, therefor.

In Column 2, Line 58, delete "GMSX" and insert -- GMSK --, therefor.

In Column 3, Line 37, delete "cracker" and insert -- tracker --, therefor.

In Column 4, Line 31, delete "hoot" and insert -- host --, therefor.

In Column 4, Line 55, delete "front-and" and insert -- front-end --, therefor.

In Column 5, Line 36, delete "an" and insert -- as --, therefor.

In Column 6, Line 46, delete "an" and insert -- as --, therefor.

UNITED STATES PATENT AND TRADEMARK OFFICE
CERTIFICATE OF CORRECTION

PATENT NO. : 6,888,903 B1
APPLICATION NO. : 09/718667
DATED : May 3, 2005
INVENTOR(S) : Niklas Stenstrom et al.

It is certified that error appears in the above-identified patent and that said Letters Patent is hereby corrected as shown below:

In Column 2, Line 36, delete " $M_t = |y_t - \bar{y}_t|^{(3)2} = |y_t - H^T U_t|^{(3)2}$; "

and insert -- $M_t = |y_t - \hat{y}_t|^2 = |y_t - H^T U_t|^2$. --, therefor.

Signed and Sealed this

Tenth Day of June, 2008

JON W. DUDAS
*Director of the United States Patent and Trademark Office*